(12) United States Patent
Hilgeman et al.

(10) Patent No.: US 6,828,937 B1
(45) Date of Patent: Dec. 7, 2004

(54) SYSTEM AND METHOD FOR LOCATING A SOURCE OF A SIGNAL

(75) Inventors: Theodore William Hilgeman, Centerport, NY (US); Stanley Morton Reich, Jericho, NY (US); Robert P. Silberstein, New York, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/264,497

(22) Filed: Oct. 4, 2002

(51) Int. Cl.[7] ................................. G01S 3/02
(52) U.S. Cl. ..................... 342/465; 342/357.06
(58) Field of Search .................... 342/457, 463, 342/465, 357.01, 357.06; 701/207, 213

(56) References Cited

U.S. PATENT DOCUMENTS

| | | | |
|---|---|---|---|
| 4,990,925 A | 2/1991 | Edelsohn et al. | 342/424 |
| 5,086,300 A | 2/1992 | Ashmore | 342/20 |
| 5,355,767 A | 10/1994 | Morita | 89/41.07 |
| 5,479,255 A | 12/1995 | Denny et al. | 356/319 |
| 6,054,949 A | 4/2000 | Grassmann | 342/383 |
| 6,166,643 A * | 12/2000 | Janning et al. | 340/573.3 |
| 6,459,409 B1 * | 10/2002 | Kohno et al. | 342/423 |
| 6,542,114 B1 * | 4/2003 | Eagleson et al. | 342/357.07 |
| 2004/0032363 A1 * | 2/2004 | Schantz et al. | 342/127 |

OTHER PUBLICATIONS

60/404602.*
60/404604.*

* cited by examiner

*Primary Examiner*—Dao Phan
(74) *Attorney, Agent, or Firm*—Fulbright & Jaworski LLP.

(57) ABSTRACT

According to one embodiment of the invention, a method for locating a source of a signal includes detecting, at a plurality of locations, a near-field signal. The method also includes processing the near-field signal. The method further includes locating a source for the near-field signal based on the processed near-field signal detected at a plurality of locations.

20 Claims, 2 Drawing Sheets

SYSTEM AND METHOD FOR LOCATING A SOURCE OF A SIGNAL

TECHNICAL FIELD OF THE INVENTION

This invention relates generally to electromagnetic signal processing and more particularly to a system and method for locating a source of a signal.

BACKGROUND OF THE INVENTION

Numerous techniques are available for conducting surveillance on targets including foreign military deployments, criminals, or terrorists. Such targets may be optically monitored by ground-based personnel, manned aircraft, unmanned aerial vehicles, or orbiting satellites. Imaging-based methods provide only partial information and are harder to use when the targets are small groups, such as terrorists, who evade detection through concealment in rugged terrain. Targets may also be monitored by detecting audio emissions. Other surveillance methods include monitoring high-frequency signals such as radar, radio or mobile telephone communications, infrared imaging, or motion-detection systems.

Any device that uses electrical power also emits electrical signals. For example devices powered by 50 or 60 Hertz (Hz) electricity, such as televisions, small electrical generators, or automotive accessories, emit electrical signals that are typically disregarded as merely electrical noise. Clandestine forces often operate with a wide range of electronic and electrical equipment in a relatively pristine environment such as mountainous or jungle terrain where there is minimal local electrical background radiation. "VLF Interferometry" by Umran S. Inan, available at http://www-star.stanford.edu/~vlf/interfermetry/VLFinfer.htm (last updated June 2001), discloses an interferometer system that takes active measures to measure a known electromagnetic signal.

SUMMARY OF THE INVENTION

According to one embodiment of the invention, a method for locating a source of a signal includes detecting, at a plurality of locations, a near-field signal. The method also includes processing the near-field signal. The method further includes locating a source of the near-field signal based on the processed near-field signal detected at a plurality of locations.

Some embodiments of the invention provide numerous technical advantages. Other embodiments may realize some, none, or all of these advantages. For example, according to one embodiment, a system detects low frequency signals and locates a source for the low frequency signals. In some embodiments, multiple signal detectors are arranged in a three-dimensional array around a low frequency signal source. In addition the low frequency signal detection system utilizes a magnetic loop field antenna small enough to be deployed on an unmanned aerial vehicle or other small device. In some embodiments, a centralized processing station receives signal information from multiple signal detectors, processes the signal information, and locates a source of the low frequency signal.

Other advantages may be readily ascertainable by those skilled in the art from the following FIGURES, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which.

DETAILED DESCRIPTION OF EXAMPLE EMBODIMENTS OF THE INVENTION

Figure 1:
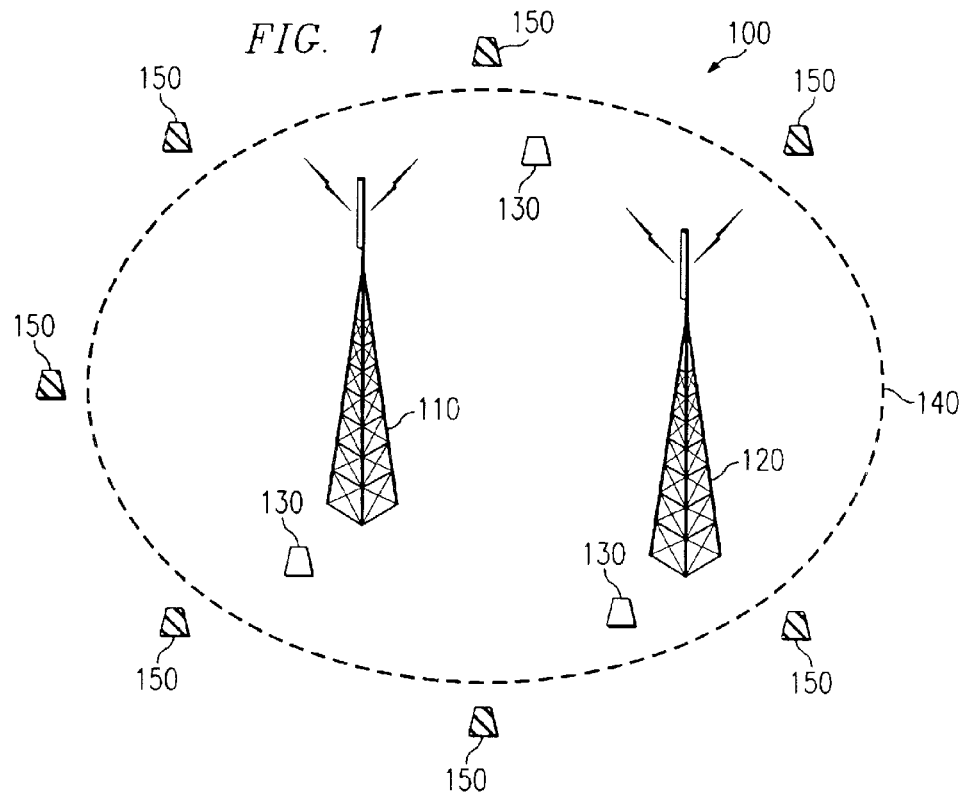
FIG. 1 illustrates a working environment including low frequency signal emitters and signal detectors.
Figure 3:
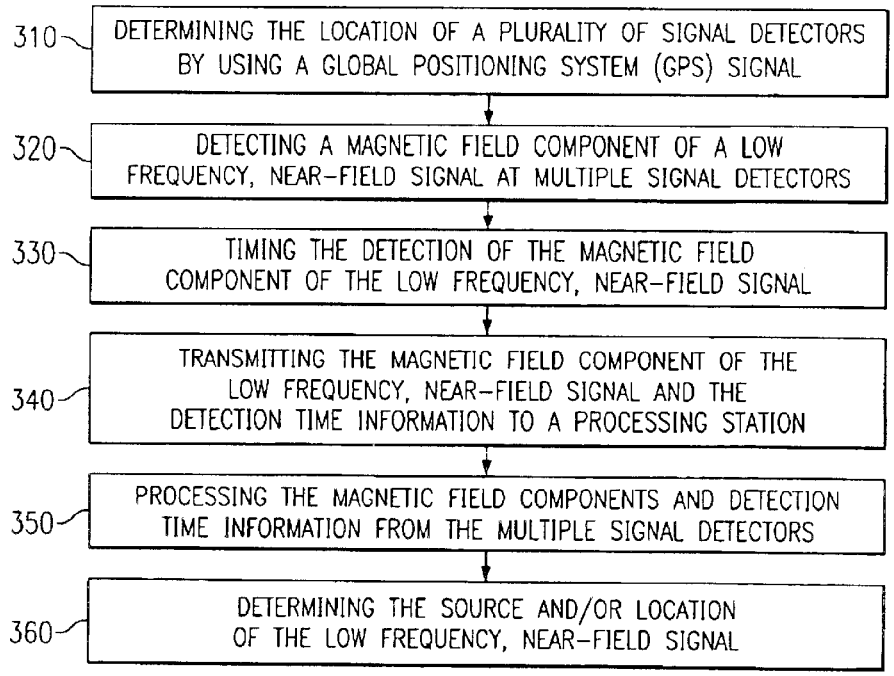
FIG. 3 illustrates a operational flowchart for the present method for mapping low frequency, near-field signals.
Figure 2:
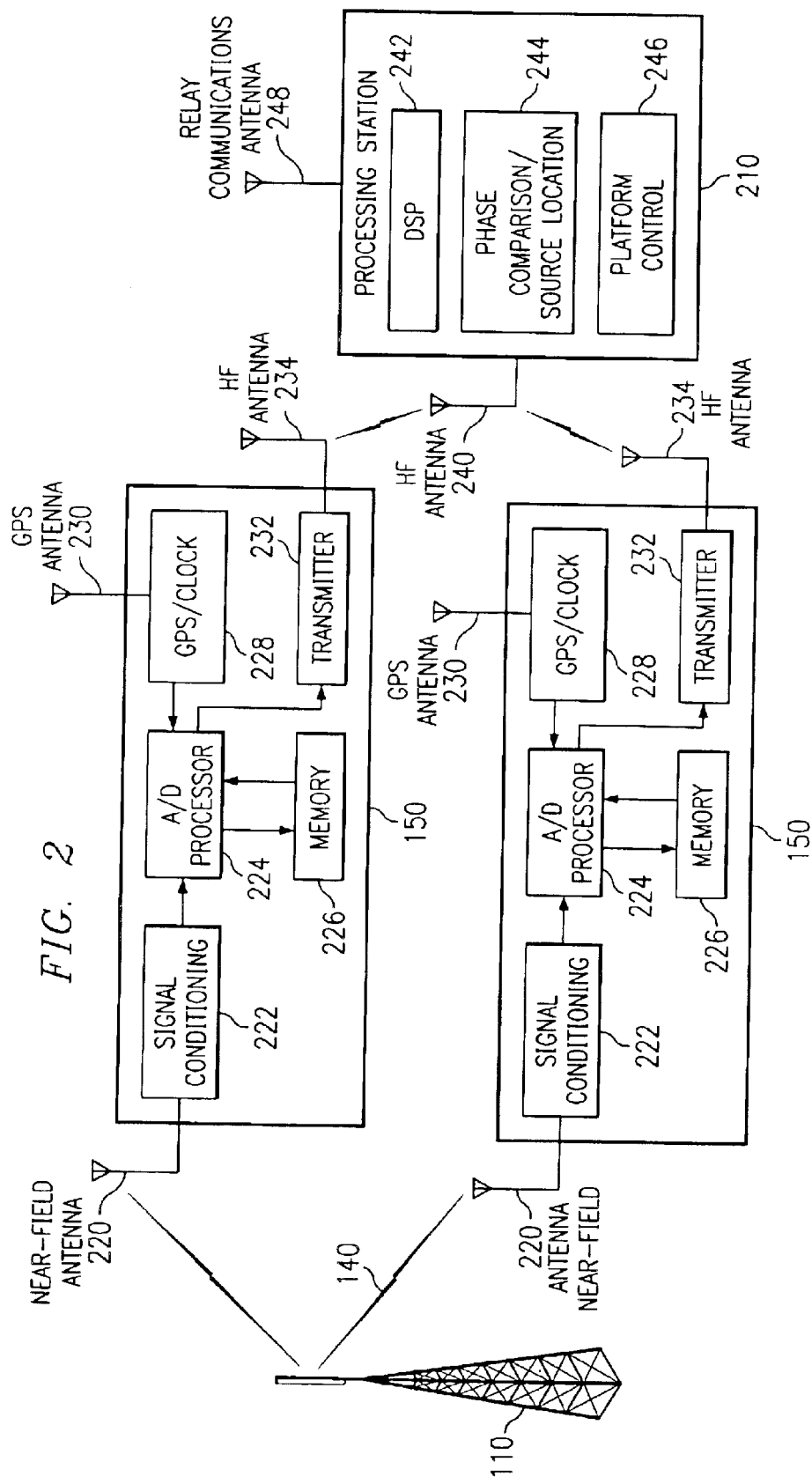
FIG. 2 illustrates a plurality of signal detectors operable to apply the present method for mapping low frequency, near-field signals.

Embodiments of the invention are best understood by referring to FIGS. 1 through 3 of the drawings, like numerals being used for like and corresponding parts of the various drawings.

FIG. 1 illustrates a working environment 100 for one embodiment of the present invention. Working environment 100 includes a source 110 of electromagnetic signals. Working environment 100 also includes a second source 120 of electromagnetic signals. For convenience FIG. 1 illustrates only two sources of electromagnetic signals, but any number of sources may be present within the scope of the present invention. A number of signal detectors 130, which may be overhead assets, are provided within border 140. Border 140 may represent a national border or any other border that defines a geographical region of interest. Additional signal detectors 150 are located outside border 140.

In one embodiment of the present invention, a system is provided for detecting clandestine forces that could be operating with a wide range of electronic and electrical equipment in a relatively pristine environment such as mountainous or jungle terrain. In environments such as these, there are few power lines and grids, radio transmitters, or other emitters to produce local electrical background radiation. In one embodiment sensitive receiver and processing techniques may be used to identify the existence and location of man-made electrical emitters. The techniques include such tasks as mapping the electricity use on an hourly basis for an entire country or detecting and measuring power output from a particular electrical device used in a remote area. A coordinated system of signal detectors 130 and 150 permits large-scale electrical use mapping with a country-wide grid, which is useful for supplying data for economic trend analysis, as well as investigations of electrical anomalies and signatures at successively finer spatial resolutions, which is useful to support military or law enforcement operations. In one embodiment of the present invention, a passive method for locating an unknown source of a signal is provided. By passive it is meant that the source is located by observing electromagnetic signals that the source emits in the course of its normal operation without influence by the method. The method requires no prior knowledge of a source or its location.

Sources 110 and 120 may be any devices that emit electromagnetic signals. Examples of such devices include, but are not limited to, televisions and video cassette recorders, small electrical generators, and automotive accessories. These devices are powered by electricity at a frequency of 50 to 60 Hertz (Hz). Other devices, however, utilize power and emit electromagnetic signals over a wide range of frequencies from 25 Hz to 15 kHz. Mapping sources that emit electromagnetic signals within this range is within the scope of the present invention.

A signal detector 130 includes an interferometric antenna that receives near-field electromagnetic signals. The radial space between a source of electromagnetic signals and a detector may be partitioned into three regions. The first region is the near-field reactive region, which is the portion of the near-field that immediately surrounds the source. The near-field reactive region refers to the distance from the source to the detector that ranges from zero to $0.62(\sqrt{D})^3/\lambda$, where D is the size of the detector, and $\lambda$ is the wavelength of the electromagnetic signal. In the near-field reactive region, the magnetic field component of the electromagnetic signal dominates the electrical field component. Beyond the near-field reactive region is the near-field radiating region, or Fresnel region. The near-field radiating region extends a distance of $0.62(\sqrt{D})^3/\lambda$ to $2D^2/\lambda$ from the source to the detector. Beyond the near-field radiating region is the far-field, or Fraunhofer region. The far-field region extends from $2D^2/\lambda$ to an infinite distance from the source. In the far-field region, the angular field distribution is essentially independent of distance.

In one embodiment of the present invention, signal detector 130 analyzes the magnetic field component of an electromagnetic signal in the near-field reactive region. At lower emission frequencies, using 60 Hz as an example, the wavelength of the signal is approximately 3000 miles. To accurately locate source 110, therefore, detectors 130 and 150 are spaced on the order of hundreds of miles from source 110. Spacing detectors 130 and 150 at these distances permits border 140 to encompass any desired geographic area, including an entire nation or other large area.

Signal detectors 130 and 150 may be located on either stationary or mobile platforms or both. Examples include, but are not limited to, overhead assets such as aircraft or satellites, unmanned aerial vehicles at low and high altitude, mobile ground troops with multiple receiver locations, and fixed or mobile ground stations. In the illustrated embodiment, emitters 130 and 150 are positioned in a manner to approximate a three-dimensional surface around source 110. By combining both ground-based and aerial or space-based platforms, a three-dimensional surface may be more nearly approximated. Source 110 may be more accurately located by using signal detectors 130 and 150 in a three-dimensional array, but one- or two-dimensional arrangements are also within the scope of the present invention.

FIG. 2 illustrates source 110 within border 140. For convenience two signal detectors 150 are illustrated, but it is envisioned that a plurality of signal detectors 130 and 150 would be deployed to detect and locate source 110. A processing station 210 may be a centralized station, or it may be co-located with any of signal detectors 130 and 150.

In one embodiment of the present invention, signal detector 150 includes a near-field antenna 220, a signal conditioning unit 222, an analog-to-digital (A/D) processor 224, a memory storage device 226, a Global Positioning System (GPS)/clock component 228, and a transmitter 232; however, other embodiments may include a different combination of components.

Near-field antenna 220 of signal detector 150 receives near-field electromagnetic emissions from source 110. In one embodiment of the present invention, near-field antenna 220 is a magnetic field loop interferometric antenna that receives the magnetic field portion of the near-field electromagnetic emission from source 110. One example of such a near-field antenna 220 is PLA-205B from ARA Incorporated (www.ara-inc.com). One advantage of a near-field antenna is that the antenna gain may be improved using multiple turns of wire. The number of wire turns cannot be increased without limit, however, because wire resistance is proportional to the number of wire turns. Wire resistance limits the efficiency of near-field antenna 220. Increasing antenna gain by increasing the number of wire turns, rather than increasing the size of the loop, means a smaller near-field antenna 220 is possible. A smaller near-field antenna 220 is preferable for such applications as Unmanned Aerial Vehicle (UAV) deployment.

Near-field antenna 220 passes the received signal to a signal conditioning unit 222. Signal conditioning unit 222 may automatically or remotely tune the center frequency, bandwidth, and dynamic range to optimize the detection of signals from various types of signal sources. Signal conditioning unit 222 is operable to perform any necessary signal filtering, amplifying, or conditioning required before passing the signal on to A/D converter 224. A/D converter 224 transforms the signal received in analog format into a digital-format signal. To accommodate a wide range of distances between source 110 and signal detector 150, a wide dynamic range signal conditioning unit 222 and A/D converter 224 may be used. In one embodiment A/D converter 224 is a 14-bit or greater A/D processor. A/D converter 224 provides both the dynamic range and oversampling rates that insure a true reproduction of the source waveform at the highest expected source frequency so that the precise amplitude and relative phase can be accurately determined. One example of such a A/D converter 224 is AD7863 from Analog Devices, Inc. (www.analog.com).

Signal detector 150 also includes a GPS/clock component 228. From a GPS antenna 230, GPS/clock component 228 receives a GPS satellite signal. GPS/clock component 228 uses the GPS satellite signal to accurately determine the location of signal detector 150. GPS/clock component 228 may also use the clock component of the GPS satellite signal to measure the time when a signal is detected by signal detector 150. The digital-format signal, location of signal detector 150, and signal detection time information are stored in memory storage device 226.

The number of signal cycles that are stored depends upon the required angular resolution, the adjacent source separation required for a particular target, atmospheric or other background noise, geographical features affecting the signal, and approximate overall signal-to-noise (S/N) ratio determined by the degree of processing. After storing an adequate number of digitized cycles of the incoming signal, the data is passed to a transmitter 232. Transmitter 232 transmits the digital-format signal, location of signal detector 150, and signal detection time information to processing station 210. In one embodiment of the present invention, transmitter 232 transmits the stored digital signals using High Frequency (HF) antenna 234. To reduce the required capacity of memory storage device 226, in one embodiment the stored signal information is discarded after the transmission is completed, allowing a new signal to be stored in its place.

Processing station includes a Digital Signal Processor (DSP) 242, a phase comparison/source location unit 244, and a platform control unit 246. Processing station 210 may be centrally located among signal detectors 150, or processing station may be co-located with one signal detector 150, or in any other location that is desirable. Processing station 210 receives the signal information transmitted from signal detectors 130 and 150 at an HF antenna 240. In one embodiment of the present invention, processing station 210 also includes a relay communications antenna 248 for receiving instructions from a command or control source.

The analysis performed by processing station 210 may include determining the amplitude, spectral content, and phase information for the electromagnetic signal. The interferometric technique, which combines and analyzes data from multiple signal detectors 130 and 150, filters out the signals from power sources in neighboring areas outside the country or region being studied. Detailed analysis of signal characteristics and optional comparison with source and propagation models allows processing station 210 to establish and provide coordinates for a location for source 110. In one embodiment of the present invention, processing station 210 employs a comparison, or reverse analysis, algorithm to determine the location of source 110. Such algorithms may be written similarly to those currently in use in non-near-field applications. In another embodiment, an inversion algorithm is utilized to locate source 110. Such algorithms may be written similarly to those currently in use in non-near-field applications. Other algorithms may be known in the art for analyzing the signal information received by processing the station 110, and these algorithms are within the scope of the present invention. Once processing station has determined a location for source 110, a return command tells signal detectors 130 and 150 to clear memory 226 if it has not already done so and detect a new signal.

FIG. 3 illustrates a processing flowchart for the method of mapping low frequency, near-field signals in one embodiment of the present invention. In step 310 each signal detector 130 and 150 determines its precise location based on the GPS satellite signal received at GPS antenna 230. In step 320 signal detectors 130 and 150 detect the magnetic field component of a low frequency, near-field signal. In step 330 the time at which the low frequency, near-field signal is detected by each signal detector 130 and 150 is determined. The signal, detector location, and detection time information is stored in memory storage device 226 in digital format.

In step 340, each of signal detectors 130 and 150 that detected the low frequency, near-field signal transmits the signal, location, and detection time information to processing station 210. Processing station 210 processes the information received from signal detectors 130 and 150 at step 350. In step 360 processing station 210 uses an interferometric algorithm to determine source 110 and a location for source 110.

Although the present invention has been described with several example embodiments, various changes and modifications may be suggested to one skilled in the art. It is intended that the present invention encompass those changes and modifications as they fall within the scope of the claims.

What is claimed is:

1. A method for location a source of a signal, comprising:
   detecting, at a plurality of locations, a near-field signal;
   processing the near-field signal;
   determining a location of a plurality of signal detectors; and
   locating a source for the near-field signal based on the processed near-field signal detected at a plurality of locations.

2. The method of claim 1, wherein the near-field signal comprises a signal in the range of 50 Hertz to 15 kiloHertz.

3. The method of claim 2, wherein the near-field signal comprises a signal in the range of 50 Hertz to 60 Hertz.

4. The method of claim 1, further comprising processing a magnetic field component of the near-field signal.

5. The method of claim 1, further comprising arranging the plurality of signal detectors in a pattern that approximates a three-dimensional surface around the source.

6. The method of claim 1, wherein determining the location of the plurality of signal detectors comprises using a plurality of Global Positioning System signals.

7. The method of claim 1, further comprising identifying a type of device that is the source of the near-field signal.

8. A system for locating a source of a near-field signal, comprising:
   a plurality of signal detectors each operable to detect a near-field signal and communicate the near-field signal to a processor, wherein the plurality of signal detectors are further operable to locate the plurality of signal detectors; and
   the processor operable to receive the near-field signals from the plurality of signal detectors, process the near-field signals, and locate a source for the near-field signals.

9. The system of claim 8, wherein the near-field signal comprises a signal in the range of 50 Hertz to 15 kiloHertz.

10. The system of claim 9, wherein the near-field signal comprises a signal in the range of 50 Hertz to 60 Hertz.

11. The system of claim 10, wherein the plurality of signal detectors detect a magnetic field component of the near-field signal.

12. The system of claim 8, wherein the plurality of signal detectors are arranged in a pattern that approximates a three-dimensional surface around the source.

13. The system of claim 8, wherein the plurality of signal detectors are operable to use a plurality of Global Positioning System signals to locate the plurality of signal detectors.

14. The system of claim 8, wherein the plurality of signal detectors are further operable to time the detection of the near-field signal.

15. The system of claim 8, wherein the processor is further operable to identify a type of device that is the source of the near-field signal.

16. A system for processing a near-field signal, comprising:
   a processor operable to receive a communication from each of a plurality of signal detectors, the communication comprising a near-field signal received at one of the plurality of signal detectors, a location of one of the plurality of signal detectors, and a detection time for the near-field signal at one of the plurality of signal detectors;
   the processor further operable to process the at least one communication from each of the plurality of signal detectors; and
   the processor further operable to locate a source for the near-field signal based on the at least one processed communication from each of the plurality of signal detectors.

17. The system of claim 16, wherein the near-field signal comprises a signal in the range of 50 Hertz to 15 kiloHertz.

18. The system of claim 16, wherein the near-field signal comprises a signal in the range of 50 to 60 Hertz.

19. The system of claim 16, wherein the processor processes a magnetic field component of the near-field signal.

20. The system of claim 16, wherein the processor is further operable to identify a type of device that is the source of the near-field signal.

* * * * *